July 21, 1942.  F. FISCHER  2,290,232
GYROSCOPIC INSTRUMENT
Filed June 28, 1939
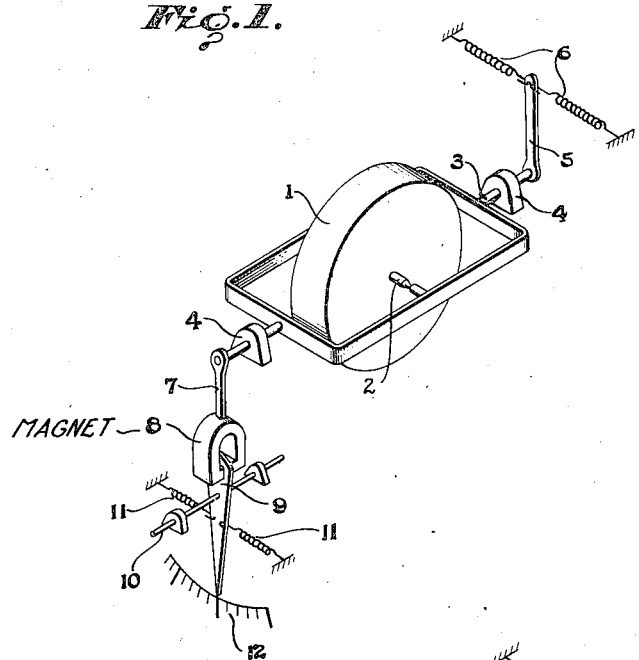
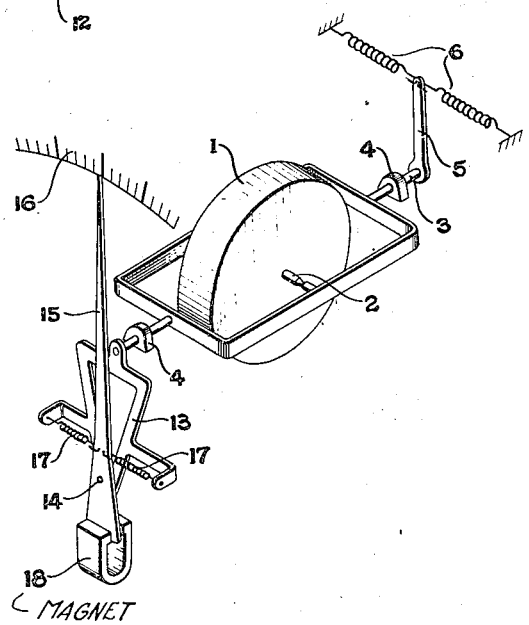
INVENTOR.
Franz Fischer.
BY Stephen Cerstvik  ATTORNEY.

Patented July 21, 1942

2,290,232

UNITED STATES PATENT OFFICE 2,290,232

GYROSCOPIC INSTRUMENT

Franz Fischer, Berlin-Wilmersdorf, Germany, assignor to Siemens Apparate und Maschinen Gesellschaft mit beschränkter Haftung, Berlin, Germany, a corporation of Germany Application June 28, 1939, Serial No. 281,755
In Germany June 30, 1938

4 Claims. (Cl. 33—204)

This invention relates to gyroscopic instruments, but more particularly to a gyroscopic instrument for indicating the angular acceleration of a mobile vehicle as, for example, an aircraft.

The invention relates to the determination of the angular acceleration from the speed of precession of a gyroscopic turn indicator measuring the speed of a turn. It concerns connecting a differentiating device to a gyroscopic turn indicator. In conformity with the invention, this is obtained by associating with the axes of precession of a gyroscopic turn indicator, an independent mobile measuring member which is displaced against the force of springs or the like. For example, this may be a member directly indicating the angular acceleration and associated with the precession axes of the gyroscope through the intermediary of an eddy current or friction connection, the coupling force of which corresponds to the speed of the influencing movement.

Further objects and details of the invention will appear from the attached drawing which is provided merely by way of illustration and not by way of limitation and in which:

Figure 1 is a first embodiment of the invention diagrammatically illustrated,

Figure 2 is a further embodiment of the invention likewise diagrammatically illustrated.

Referring to Figure 1, there is illustrated a gyroscopic turn indicator of the usual construction wherein the gyroscopic rotor 1 has horizontal shafts 2 for rotation and horizontal precession shafts 3 which latter are mounted in supports 4, which are affixed or disposed on the frame of, for instance, an aircraft, the turning of which is to be measured. On one precession shaft 3, is affixed an arm 5 on which engage restraining springs 6 and the other precession shaft carries an arm 7 which supports a U-shaped permanent magnet between the poles of which an eddy current member 9 having a fixed axis of rotation 10 and likewise fixedly supported restraining springs 11, is swingably arranged. The eddy current member 9 in the illustrated embodiment is shown as a pointer which is adapted to play over a scale 12.

When the gyroscopic device turns about its sensitive axis (the vertical axis in the case illustrated) the precession shafts and consequently the permanent magnet 8 fixed to the arm 7, receive a displacement corresponding in amount and direction to the angular speed of turn. The permanent magnet seeks to carry with it the eddy current member 9 and the effective force of the eddy current is proportional to the relative speed of displacement between the magnet 8 and the eddy current member 9 and consequently to the acceleration of the movement which influences the gyroscopic turn indicator. Since the eddy current member 9 is restrained through springs 11 in its zero position, consequently, it oscillates out of its illustrated zero position in conformity with said angular acceleration so that the angular acceleration is directly obtained on the scale 12.

The turn indicator illustrated in the embodiment of Figure 2 is constructed and mounted in the same manner as that of Figure 1. According to Figure 2, however, on the forward precession shaft, there is disposed a frame 13 which carries the axis of rotation 14 of the eddy current member 15, which likewise, as in Figure 1, is constructed as a pointer adapted to play over a scale 16. This eddy current member is restrained in its zero position by means of springs 17, but it is to be noted that the springs in this embodiment are not fixed in place, but take support on the frame 13. The U-shaped magnet 18 between the poles of which the eddy current member 15 plays is, in the embodiment of Figure 2, fixed in place.

In the event that the magnet 18 were not present, the pointer 15 would not be displaced relative to the frame 13 and thus the pointer, as well as the frame 13, would oscillate corresponding purely to the stroke of precession of the turn indicating gyroscope and thus purely corresponding to the speed of the turn to be measured. As illustrated, when the magnet 18 is provided, there results a relative displacement between the pointer 15 and the frame 13 corresponding to the speed of the precession movement, thus corresponding to the acceleration of the turning movement. Consequently, there is indicated on the scale 16, the sum or the difference of angular speed and angular acceleration according as the scale is disposed below or above the axis of the turn indicator.

Although but two embodiments of the invention have been illustrated and described in detail, it is to be expressly understood that the invention is not limited thereto. Various changes may be made in the design and arrangement of the parts without departing from the spirit and scope of the invention as the same will now be apparent to those skilled in the art. For a definition of the limits of the invention, reference is to be had primarily to the appended claims.

What I claim is:

1. A gyroscopic instrument for indicating angular acceleration of an aircraft and the like during turning about an axis thereof, comprising a two-degree-of-freedom gyroscope having a rotor, a gimbal frame mounting said rotor for spinning about an axis perpendicular to the axis of turn of said craft and for precession about an axis mutually perpendicular to said spin axis and said turn axis, yielding means for opposing said precession, whereby the amount of said precession is a function of the rate of turn of said craft, magnetic means carried by and movable with said gimbal frame as a function of said rate of turn for producing a magnetic field, and resiliently constrained indicating means influenced by said magnetic field for actuation thereby to indicate angular acceleration of turning of said craft.

2. A gyroscopic instrument responsive to angular acceleration of a craft about an axis, comprising a gyroscope having a rotor, means mounting said rotor for spinning about a second axis perpendicular to said first axis and for precession about a third axis mutually perpendicular to said first and second axes, means yieldingly opposing said precession, whereby the angle of said precession is a function of the rate of turn of said craft about said first axis, a permanent magnet carried by said mounting means and movable with said gyroscope about the axis of precession, a movable member having a portion thereof disposed in the field of said magnet for actuation by the magnetic drag of said field, and resilient means opposing the actuation of said member by said magnetic drag action, whereby said member is actuated in accordance with the angular acceleration of said craft about said first axis.

3. A gyroscopic instrument responsive to angular acceleration of a craft about an axis, comprising a gyroscope having a rotor, means mounting said rotor for spinning about a second axis perpendicular to said first axis and for precession about a third axis mutually perpendicular to said first and second axes, resilient means opposing said precession, whereby the amount of said precession is a function of the rate of turn of said craft about said first axis, a mounting bracket carried by and movable with the mounting means of said rotor in precession, a member pivotally mounted on said mounting bracket, whereby said member may move angularly with respect to said bracket and may also move bodily with said bracket upon precession of said gyroscope, resilient means opposing pivotal movement of said member on said bracket, and a permanent magnet fixedly mounted and providing a magnetic field traversing a portion of said member to oppose bodily movement thereof with said bracket, whereby said member is moved angularly with respect to said bracket in accordance with the angular acceleration of the craft about said first axis.

4. A gyroscopic instrument for indicating angular acceleration of a craft about an axis, comprising a gyroscope having a rotor, means mounting said rotor for spinning about a second axis perpendicular to said first axis and for precession about a third axis mutually perpendicular to said first and second axes, yielding means opposing said precession, whereby the amount of said precession is a function of the rate of turn of said craft about said first axis, a permanent magnet carried by and movable with said mounting means as the gyro precesses, an indicating member having a portion thereof disposed in the field of said magnet for actuation by the magnetic drag of said field, and yielding means opposing the actuation of said indicating member by said magnetic drag action, whereby said member indicates the amount of acceleration of said craft about said first axis.

FRANZ FISCHER.